United States Patent
Matsumoto et al.

(10) Patent No.: US 11,448,578 B2
(45) Date of Patent: Sep. 20, 2022

(54) LAMINATION SHAPING POWDER EVALUATION METHOD AND LAMINATION SHAPING POWDER THEREFOR

(71) Applicants: FUKUDA METAL FOIL & POWDER CO., LTD., Kyoto (JP); TECHNOLOGY RESEARCH ASSOCIATION FOR FUTURE ADDITIVE MANUFACTURING, Tokyo (JP)

(72) Inventors: Seiichi Matsumoto, Kyoto (JP); Yuji Sugitani, Kyoto (JP)

(73) Assignees: FUKUDA METAL FOIL & POWDER CO., LTD., Kyoto (JP); TECHNOLOGY RESEARCH ASSOCIATION FOR FUTURE ADDITIVE MANUFACTURING, Tokyo (JP)

( * ) Notice: Subject to any disclaimer, the term of this patent is extended or adjusted under 35 U.S.C. 154(b) by 304 days.

(21) Appl. No.: 16/641,983

(22) PCT Filed: Aug. 25, 2017

(86) PCT No.: PCT/JP2017/030509
§ 371 (c)(1),
(2) Date: Feb. 25, 2020

(87) PCT Pub. No.: WO2019/038909
PCT Pub. Date: Feb. 28, 2019

(65) Prior Publication Data
US 2020/0264086 A1 Aug. 20, 2020

(51) Int. Cl.
*G01N 11/14* (2006.01)
*B33Y 30/00* (2015.01)
(Continued)

(52) U.S. Cl.
CPC .......... *G01N 11/14* (2013.01); *B23K 15/0086* (2013.01); *B23K 26/342* (2015.10); *B33Y 30/00* (2014.12); *B33Y 50/00* (2014.12)

(58) Field of Classification Search
CPC .......... G01N 11/00; G01N 11/14; G01N 3/24; B33Y 30/00; B33Y 40/00; B33Y 50/00; B33Y 70/00
(Continued)

(56) References Cited

U.S. PATENT DOCUMENTS 9,801,820 B2 * 10/2017 To .................. A61K 9/1694
2014/0050795 A1 * 2/2014 Morton ............ A61K 31/405
514/420

(Continued)

FOREIGN PATENT DOCUMENTS

CN 105642879 A 6/2016
CN 108964774 A 7/2017
(Continued)

OTHER PUBLICATIONS

Miyanami et al. "Direct Shear Test of Powder Beds" Kona Powder and Particle Journal, No. 1 (1983), (Year: 1983).*
(Continued)

*Primary Examiner* — John Fitzgerald
*Assistant Examiner* — Jean F Morello
(74) *Attorney, Agent, or Firm* — Ladas & Parry LLP

(57) ABSTRACT

This invention relates to a method of evaluating powder for lamination shaping by stable criteria. In this method, it is evaluated whether powder for lamination shaping can be spread into a uniform powder layer in the lamination shaping, wherein the powder is evaluated using, as a flowability of the powder, an adhesive force of the powder calculated from a failure envelope obtained by a shear test. The shear test is conducted by a powder rheometer, and the adhesive
(Continued)

force is obtained from the relationship between a normal stress and a shearing stress at the powder rheometer. If the adhesive force is 0.450 kPa or less, the powder is evaluated to be spread into a uniform powder layer in the lamination shaping. Furthermore, if at least one of that the 50% particle size of the powder obtained by a laser diffraction method is 3 to 250 μm and that the apparent density of the powder is 3.5 g/cm³ or more is satisfied, the powder is evaluated to be spread into a uniform powder layer in the lamination shaping.

15 Claims, 23 Drawing Sheets

(51) Int. Cl.
  *B33Y 50/00* (2015.01)
  *B23K 26/342* (2014.01)
  *B23K 15/00* (2006.01)
(58) Field of Classification Search
  USPC .......................................................... 73/843
  See application file for complete search history.

(56) References Cited

U.S. PATENT DOCUMENTS

| 2015/0315399 | A1* | 11/2015 | Bredt | ................ | C09D 101/284 |
| | | | | | 106/801 |
| 2016/0288206 | A1* | 10/2016 | Ohtaki | ................. | C04B 35/486 |
| 2018/0339343 | A1* | 11/2018 | Hashizume | ............ | B22F 9/082 |
| 2019/0226058 | A1* | 7/2019 | Fujieda | ................... | C22C 30/00 |

FOREIGN PATENT DOCUMENTS

| EP | 1118404 | A1 | | 7/2001 |
| JP | 6140540 | A | | 2/1986 |
| JP | 2004037169 | A | | 2/2004 |
| JP | 2004301654 | A | | 10/2004 |
| JP | 2004302824 | A | * | 10/2004 |
| JP | 2006138817 | A | | 6/2006 |
| JP | 2016073919 | A | | 5/2016 |
| JP | 2016172904 | A | | 9/2016 |
| JP | 2016194143 | A | | 11/2016 |
| JP | 2016204700 | A | | 12/2016 |
| JP | 2017066432 | A | | 4/2017 |
| JP | 2017127997 | A | | 7/2017 |
| JP | 2017127998 | A | | 7/2017 |
| JP | 2016183683 | A | | 10/2018 |
| JP | 2019-537525 | A | | 12/2019 |
| WO | 2016158687 | A1 | | 6/2016 |
| WO | 2017110445 | A1 | | 6/2017 |

OTHER PUBLICATIONS

Carson et al. "Bulk Properties of Powders" ASM Handbook, vol. 7. 1998 (Year: 1998).*
English description of JP200402824 accessed from espacenet.com Feb. 24, 2022.*
Japanese Office Action with an English translation dated Feb. 16, 2021 for corresponding Japanese Patent Application No. JP 2019-537524.
Espacenet English abstract of WO 2019/038910 A1 which corresponds to JP 019-537525 A.
International Search Report (ISR) and Written Opinion (WO) dated Nov. 21, 2017 for Application No. PCT/JP2017/030509.
Extended European Search Report dated Jan. 15, 2021 tor corresponding European Application No. EP 17922114.8.
Espacenet English abstract of JP 2817127998 A.
Espacenet English abstract of CN 105642879 A.
Japanese Industrial Standards (JIS Z 2502: 2012), "Metallic powders—Determination of flow rate by means of a calibrated funnel (Hall flowmeter)".
The Association of Powder Process Industry and 1-9 Engineering, Japan, Standards of Association of Powder Process Industry and Engineering, Apple SAP 15-13:2013 'Direct shear testing method of powder bed', Mar. 19, 2013 (Mar. 19, 2013), pp. 1 to 4.
Chinese office action with an English translation dated Apr. 15, 2022 for Application No. CN 201780093811.2.
Study on the flowability of titanium alloy powder, Wang Changzhen et al., Powder Metallurgy Technology, vol. 34, No. 5, pp. 330-335.
Development of iron based pre-mixed powder improved flowability and filling-ability in PM manufacturing, Yoshikazu Seki, translated by Han Fenglin, Powder Metallurgy Technology, vol. 24, No. 5, pp. 388-393.
Characteristic of Incooel625 alloy powder in selective laser melting, Yang Qiyun et al., China Powder Science and Technofogy, vol. 22, No. 03, pp. 27-32.
Characterization Techniques for Determining Flow Property of Powder in Powder Coating Process, Tong Shi et al., Paint and Coatings Industry. vol. 47, No. 7, pp. 58-65.
TC4 Alloy Powder Prepared by Electrode Induction Melting Gas Atomization for Laser 3D Printing, Sui-Yuan Chen, et al., Journal of Northeastern University, vol. 38, No. 4, pp. 497-601.
Effects of preparation methods on the properties of Ti-6Al-4V alloy powders for 3D printing, Xinhua Mao, et al., Guangdong Institute of Materials and Processing, National Engineering Research Center of Powder Metallurgy of Titanium & Rare metals. vol. 11, No. 1, pp. 13-18.

* cited by examiner

| SQUEEGEEING CONDITIONS | | EXAMPLE 1 | EXAMPLE 2 | EXAMPLE 3 |
|---|---|---|---|---|
| VELOCITY | AMOUNT | | | |
| LOW | LARGE | | | |
| LOW | SMALL | | | |
| HIGH | | | | |

FIG. 4

EXAMPLE 1

EXAMPLE 2

EXAMPLE 3

EXAMPLE 4

EXAMPLE 5

EXAMPLE 6

EXAMPLE 7

EXAMPLE 8

EXAMPLE 9

COMPARATIVE EXAMPLE 1

COMPARATIVE EXAMPLE 2

COMPARATIVE EXAMPLE 3

COMPARATIVE EXAMPLE 4

COMPARATIVE EXAMPLE 5

COMPARATIVE EXAMPLE 6

COMPARATIVE EXAMPLE 7

LAMINATION SHAPING POWDER EVALUATION METHOD AND LAMINATION SHAPING POWDER THEREFOR

RELATED APPLICATION

This application is an application under 35 U.S.C. 371 of International Application No. PCT/JP2017/030509 filed on Aug. 25, 2017, the entire contents of which are incorporated herein by reference.

TECHNICAL FIELD

The present invention relates to a lamination shaping powder evaluation method and a lamination shaping powder therefor.

BACKGROUND ART

In the abovementioned technical field, patent literature 1 discloses a technique by which the measurement value of the fluidity complying with JIS Z 2502 is set at 10 to 25 sec/50 g as a condition when using WC-base hard metal particles as lamination shaping granules. Also, non-patent literature 1 describes the standards of JIS Z 2502 as a metal powder-fluidity measurement method.

CITATION LIST

Patent Literature

Patent literature 1: Japanese Patent Laid-Open No. 2016-172904

Non-Patent Literature

Non-patent literature 1: Japanese Industrial Standards (JIS Z 2502: 2012), "Metallic powders-Determination of flow rate by means of a calibrated funnel (Hall flowmeter)"
Non-patent literature 2: Standards of The Association of Powder Process Industry and Engineering, Japan (SAP15-13: 2013), "Direct Shear Testing Method of Powder Bed", The Association of Powder Process Industry and Engineering, Japan, established on Mar. 19, 2013

SUMMARY OF THE INVENTION

Technical Problem

Unfortunately, the measurement of the fluidity complying with JIS Z 2502 using the technique described in the above literature is unstable as a criterion of a lamination shaping powder because a fine powder probably usable for lamination shaping cannot be measured or the same powder can be measured or cannot be measured due to a slight change in measurement environment. This makes the evaluation of a lamination shaping powder insufficient.

The present invention provides a technique of solving the above-described problem.

Solution to Problem

One example aspect of the present invention provides a method of evaluating whether powder for lamination shaping can be spread into a uniform powder layer in the lamination shaping, wherein the powder is evaluated using, as a flowability of the powder, an adhesive force of the powder calculated from a failure envelope obtained by a shear test.

Another example aspect of the present invention provides powder, which has been evaluated to be spread into a uniform powder layer in lamination shaping by the above-mentioned method.

Advantageous Effects of Invention

According to the present invention, a lamination shaping powder can be evaluated by stable criteria.

BRIEF DESCRIPTION OF DRAWINGS

FIG. 4 is a view showing the test results of the squeegeeing properties of powders of Examples 1 to 3 of the present invention;

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

<<Manufacture of Laminated and Shaped Product>>

Figure 1:
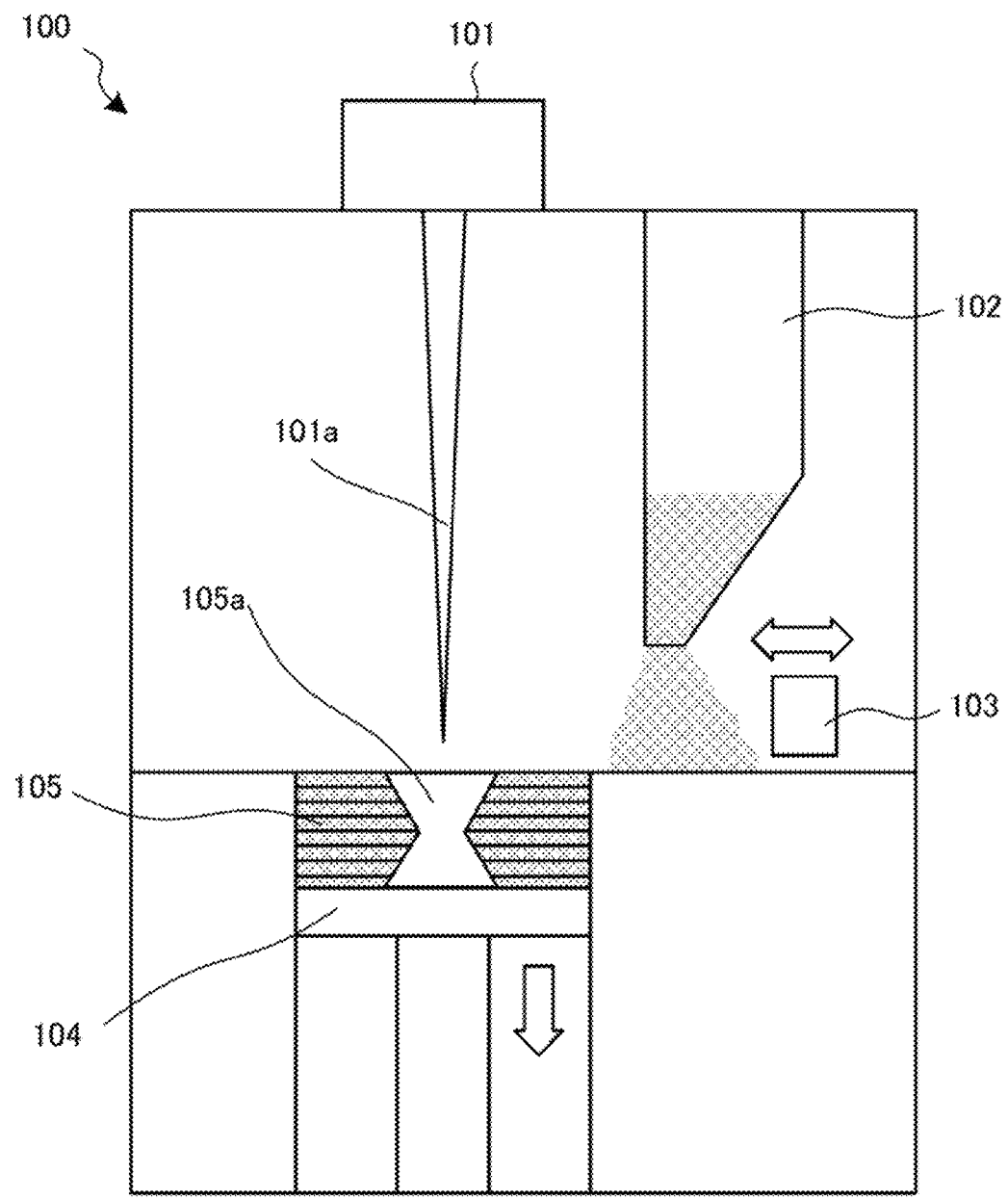
FIG. 1 is a view showing a configuration example of a laminating and shaping apparatus of an example embodiment according to the present invention.

FIG. 1 is a view showing a schematic configuration example of a laminating and shaping apparatus 100 of this example embodiment. The laminating and shaping apparatus 100 includes an emission mechanism 101 for an electron beam or fiber laser 101a, a hopper 102 as a powder tank, a squeegeeing blade 103 for forming a powder bed by spreading a powder by a predetermined thickness, and a table 104 that repetitively moves down by a predetermined thickness in order to perform lamination. The squeegeeing blade 103 and the table 104 cooperate with each other to generate a powder laminated portion 105 having a uniform predetermined thickness. Each layer is irradiated with the fiber laser 101a based on slice data obtained from 3D-CAD data, thereby melting a metal powder (in this example embodiment, a metal powder, particularly a copper powder or a copper alloy powder) and manufacturing a laminated and shaped product 105a.

As described above, a manufactured product having an arbitrary shape can be obtained by melting and solidifying a lamination shaping powder by using the electron beam or fiber laser 101a as a heat source. For example, when using a copper powder, fine shapin can be performed in the fields of electric circuit connectors, heat sinks, and heat exchangers. However, the lamination shaping powder is not limited to a metal powder such as a copper powder.

<<Manufacture of Lamination Shaping Powder>>

The lamination shaping powder of this example embodiment can be manufactured by, e.g., "a rotating disk method", "a gas atomizing method", "a water atomizing method", "a plasma atomizing method", or "a plasma rotating electrode method". In this example embodiment, "the gas atomizing method" was used among these methods. In this gas atomization, a gas such as helium, argon, or nitrogen was used, and a lamination shaping powder was manufactured by controlling powdering by adjusting the pressure and flow rate of the gas. However, a similar lamination shaping powder can also be manufactured by using another manufacturing method. The manufactured lamination shaping powder was classified by a predetermined classification size.

<<Conditions Usable as Lamination Shaping Powder>>

Conditions usable as a lamination shaping powder are presumably as follows:

(1) A powder has a squeegeeing property capable of forming a powder bed when spread by a predetermined thickness.

(2) A powder can be melted and shaped when irradiated with an electron beam or a fiber laser.

(3) A laminated and shaped product formed by lamination shaping has properties that withstand the conditions of each application.

Of these conditions, the squeegeeing property is a criterion for determining whether a powder can be used by the laminating and shaping apparatus 100, and a powder having an insufficient squeegeeing property is basically excluded from the lamination shaping powder.

<<Evaluation Targets of Squeegeeing Property>>

A powder having a sufficient squeegeeing property requires the following conditions.

(1) The particle size of the lamination shaping powder particles falls within a range in which a powder bed can be formed. For example, when the 50% particle size of powder particles is measured or calculated by a laser diffraction method, the 50% particle size falls within a predetermined range.

(2) The powder packing ratio of the lamination shaping powder falls within a range appropriate for powder bed formation. For example, when the apparent density (AD) of the power is measured or calculated, the AD falls within a predetermined range.

(3) The flowability of the lamination shaping powder falls within a range in which the power can be supplied from a supply hopper and an appropriate powder bed can be formed. For example, when the flowability of the powder is measured or calculated, the flowability falls within a predetermined range.

<<Evaluation of Flowability>>

The flowability is evaluated by using the flow rate (FR) complying with JIS Z 2502 as disclosed in patent literature 1 and non-patent literature 1. However, the measurement of the fluidity complying with JIS Z 2502 is unstable as a criterion of a lamination shaping powder because a fine powder probably usable for lamination shaping cannot be measured or the same powder can be measured or cannot be measured due to a slight change in measurement environment. This makes the evaluation of a lamination shaping powder insufficient.

For example, a fine powder having an average particle size of 20 to 45 μm is generally used as a powder for lamination shaping, but the use of a finer powder of 20 μm or less is desirable in the future. A fine powder has a strong adhesive force and hence has a low flowability, and this makes it difficult to generate a powder layer necessary for lamination shaping. It is sometimes impossible to measure a fine powder like this by using JIS Z 2502, so this method is insufficient to properly evaluate the flow form of a powder for lamination shaping. If measurement is impossible, it becomes difficult to evaluate the powder as a lamination shaping powder. In practice, however, it is sometimes possible to laminate even an unmeasurable fine powder depending on an apparatus or a supply method, and this makes evaluation difficult.

The flowability of a fine powder is low because the adhesive force between particles forming a fine powder is strong and the kinetic energy of the particles is very low. It is known that the adhesive force of a powder relatively increases as the particle size decreases. The adhesive force functions as binding power that hinders the flowability of a powder. On the other hand, the kinetic energy is proportional to the mass, but the mass of a particle is proportional to the cube of the particle size, so the kinetic energy of a fine particle becomes very low. Consequently, the gravity and the inertia force necessary to move particles become low and cannot exceed the adhesive force as binding power. This makes it impossible to cause the flow of a powder.

In this example embodiment, therefore, as a standard of the flowability, not the method complying with JIS Z 2502 that makes measurement results unstable but the adhesive force with which measurement results are stably obtainable is used as an evaluation criterion of the flowability and combined with other evaluation targets.

(Adhesive Force Measurement Method)

The adhesive force is calculated based on the shearing force test as disclosed in non-patent literature 2.

Figure 2A:
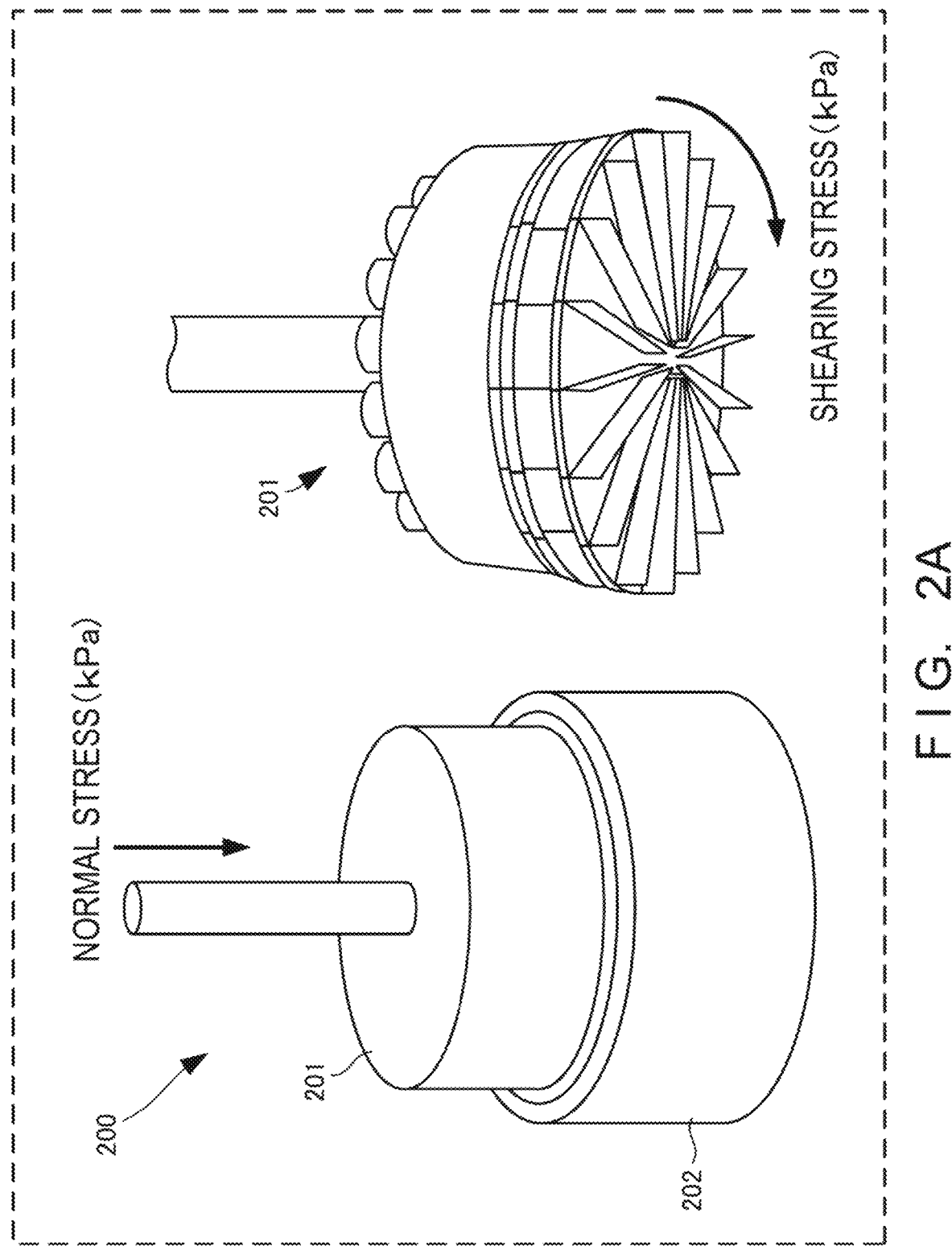
FIG. 2A is a view showing the arrangement of a shearing stress measurement unit for measuring a shearing stress in the example embodiment of the present invention.

FIG. 2A is a view showing the arrangement of a shearing stress measurement unit 200 for measuring the shearing stress in this example embodiment. The shearing stress measurement unit 200 measures the shearing stress by a rotary cell method. A rotary cell 201 including a blade attached to its lower portion is placed inside an external cell 202, and a powder to be measured is packed in the upper portion of the external cell 202. While a predetermined normal stress is applied from the rotary cell 201 to the external cell 202, the shearing stress is measured from the torque of the rotary cell 201.

Figure 2B:
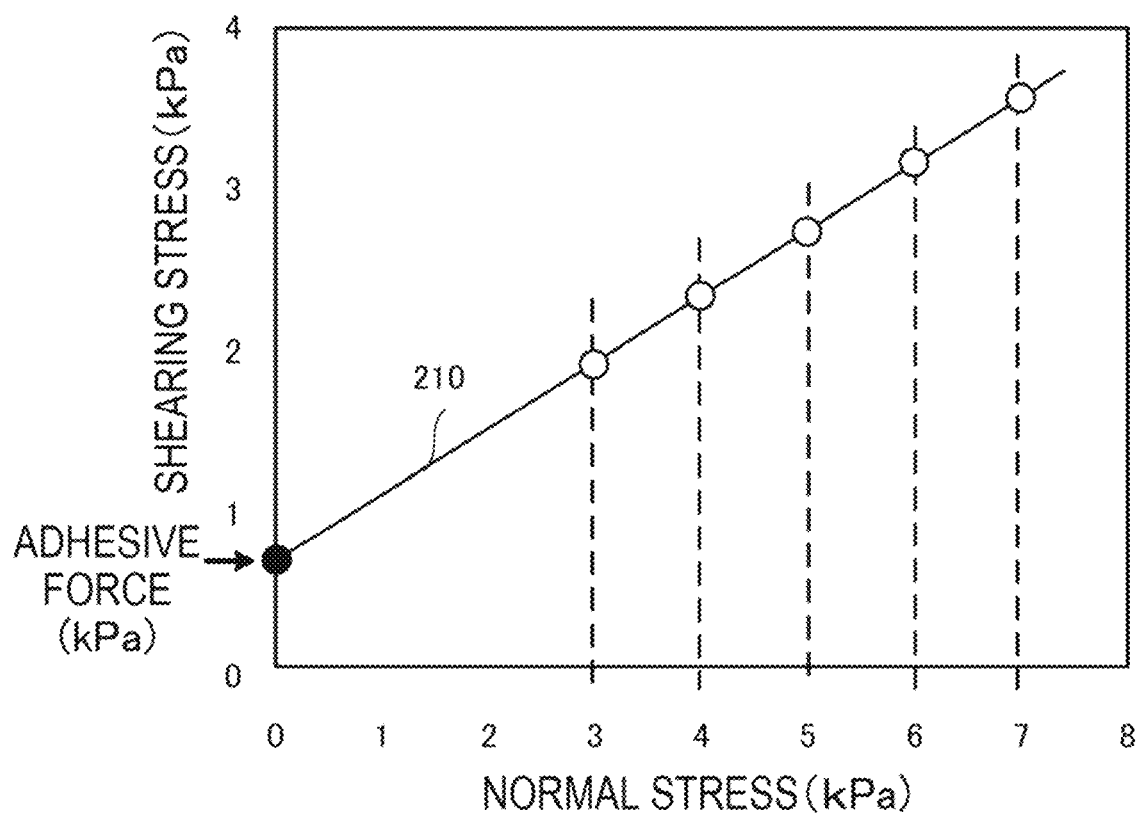
FIG. 2B is a view showing a method of obtaining an adhesive force based on the shearing stress measured by the shearing stress measurement unit in the example embodiment of the present invention.

FIG. 2B is a graph showing a method of obtaining the adhesive force based on the shearing stress measured by the shearing stress measurement unit 200. As shown in FIG. 2B, a line obtained by plotting the shearing stress measured by the shearing stress measurement unit 200 when shear occurs under each normal stress is called a failure envelope, and a powder layer slips if a shearing stress stronger than the failure envelope is applied. A shearing stress when the normal stress is 0 (zero) on the failure envelope (e.g., 210) is calculated as the adhesive force between particles.

<<Evaluation Results of Squeegeeing Property>>

In this example embodiment, an evaluation criterion of the squeegeeing property of a lamination shaping powder was analyzed by comparing numerical values of the squeegeeing property evaluation conditions including the adhesive force with evaluation results indicating whether the actual squeegeeing property is sufficient in lamination shaping.

(Evaluation of Squeegeeing Property)

Figure 3:
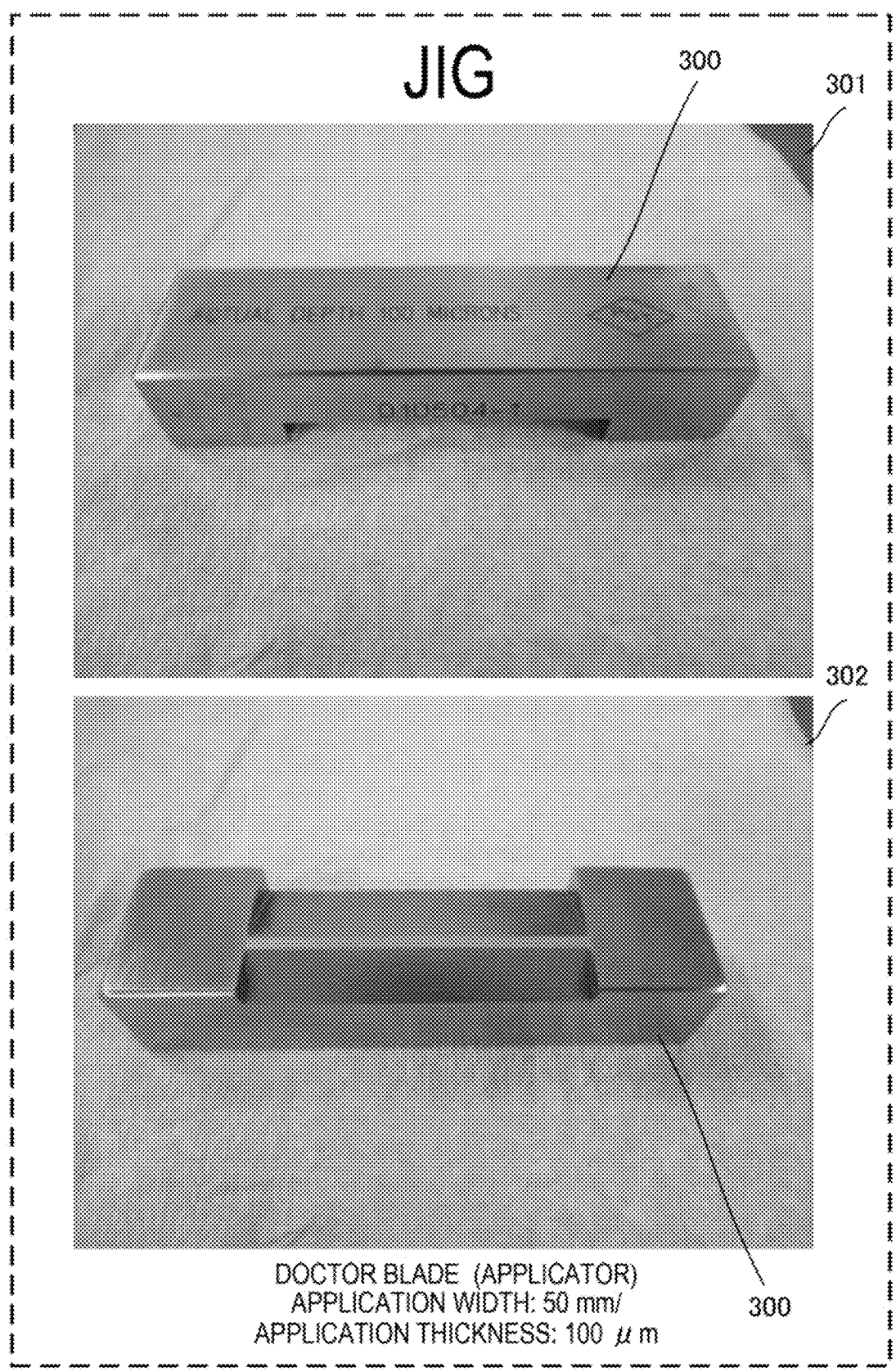
FIG. 3 is a view showing a jig to be used to test a squeegeeing property in the example embodiment of the present invention.

FIG. 3 is a view showing a jig 300 for testing the squeegeeing property in this example embodiment. An upper view 301 of FIG. 3 is a view showing the jig 300 from its upper surface, and a lower view 302 of FIG. 3 is a view showing the jig 300 from its bottom surface. The jig 300 is called a doctor blade or an applicator, and obtained by forming a gap by processing one surface of a metal block. The jig 300 can apply a paint or ink with a predetermined film thickness.

In this example embodiment, the two ends of the jig 300 having an application width of 50 mm and an application thickness of 100 μm were picked up, and the jig 300 was pressed against the table 104 of the laminating and shaping apparatus 100 or against an equivalent horizontal plate and pulled at a predetermined velocity, thereby forming a powder layer. After that, whether a uniform powder layer was formed was observed. Note that this process was repetitively performed by changing the initial powder amount or the velocity.

In addition, the relationship between the squeegeeing property test using the jig 300 and the squeegeeing property obtained by the laminating and shaping apparatus 100 was confirmed by squeegeeing a powder by using the laminating and shaping apparatus 100.

<<Evaluation Criteria of Squeegeeing Property>>

From the relationship between the abovementioned characteristics measured from the powders, the squeegeeing property test using the jig, and the squeegeeing property obtained by the laminating and shaping apparatus, the following evaluation criteria were obtained when using a copper powder or a copper alloy powder.

(1) The 50% particle size of copper powder particles is 3 to 250 μm when measured by a laser diffraction method. For example, if the 50% particle size of copper powder particles is less than 3 μm, there is no flowability, and no powder bed can be formed even in an SLM type laminating and shaping apparatus. If the 50% particle size of copper powder particles is larger than 250 μm, the surface of a powder bed roughens and no powder bed appropriate for shaping can be formed even in an EBM type laminating and shaping apparatus.

(2) The apparent density (AD) of a copper powder is equal to or more than 3.5 $g/cm^3$. For example, if the apparent density of a copper powder is less than 3.5 $g/cm^3$, the powder packing ratio of a powder bed decreases and no appropriate powder bed can be formed in a laminating and shaping apparatus.

(3) The flowability (adhesive force) of a copper powder is equal to or less than 0.450 kPa. If the flowability of a copper powder is more than 0.450 kPa, a supply hopper cannot supply the powder and no appropriate powder bed cannot be formed in a laminating and shaping apparatus.

Of the abovementioned three conditions, (2) the apparent density changes in accordance with the type of lamination shaping powder or the type of metal, but (1) the 50% particle size and (3) the flowability (adhesive force) fall within similar ranges regardless of the type of laminating and shaping apparatus or the type of metal. In evaluation by (3), the flowability (adhesive force) is essential, and at least one of (1) the 50% particle size and (2) the apparent density restricts the conditions of a lamination shaping powder.

<<Effects of this Example Embodiment>>

In this example embodiment, a lamination shaping powder can be evaluated by stable criteria. In addition, the stable criteria make it possible to easily find a powder usable as a lamination shaping powder.

That is, when the adhesive force of a powder calculated from the failure envelope obtained by a shear test using a powder rheometer is 0.450 kPa or less, it is possible to obtain a high-density homogeneous laminated and shaped product having a sufficient flowability with which a uniform powder layer can be spread. If the adhesive force of a powder calculated from the failure envelope obtained by the shear test using the powder rheometer is larger than 0.450 kPa, the squeegeeing property of the powder becomes insufficient.

Also, if the 50% particle size measured by the laser diffraction method is less than 3 μm, the powder causes surface defects, e.g., violently scatters and adheres to the manufacture product again. If the 50% particle size is larger than 75 μm in lamination shaping using a laser beam, or if the 50% particle size is larger than 250 μm in lamination shaping using an electron beam, the surface of the manufacture product roughens and causes an appearance defect. Alternatively, a melt pool formed in a powder layer during beam irradiation does not reach a solidified layer immediately below the pool. Since this causes insufficient melting and solidification, a shaping defect occurs.

Furthermore, if the apparent density is less than 3.5 g/cm$^3$, the packing property of the powder in the powder layer deteriorates, and the density of the manufactured product decreases because pores are formed in the manufactured product.

Second Example Embodiment

In this example embodiment, a lamination shaping powder is evaluated by further taking account of the "satellite adhesion ratio" of the powder particles. The "satellite adhesion ratio" is the ratio of powder particles on which satellites are adhered, in all particles including powder particles on which no satellites are adhered.

For example, the flowability and the spreadability of a powder are hindered if the powder has a nonuniform shape due to strain or a large amount of satellites are adhered on the powder, and no uniform powder layer can be formed. Since this generates pores or decreases the density, a high-density high-quality homogeneous manufacture product cannot be obtained. A powder is ideally closer to a spherical shape in order to obtain a sufficient flowability and a sufficient spreadability. However, the manufacturing cost rises in order to obtain a powder having a higher spherical degree. The present inventors made extensive studies and have found that it is possible to ensure a sufficient flowability and a sufficient spreadability suitable for lamination shaping by controlling the satellite adhesion amount to a predetermined amount or less.

<<Measurement of Satellite Adhesion Ratio>>

In this example embodiment, the satellite adhesion ratio was obtained by capturing a scanning electron microscope (SEM) image of powder particles, and counting powder particles on which satellites were adhered and powder particles on which no satellites were adhered. However, it is also possible, by image processing, to count powder particles on which satellites are adhered and powder particles on which no satellites are adhered.

<<Effects of this Example Embodiment>>

According to this example embodiment, it is possible to more accurately evaluate whether a lamination shaping powder is usable.

EXAMPLES

By using Examples 1 to 9 according to this example embodiment and Comparative Examples 1 to 7, the evaluation criteria of the lamination shaping powder evaluation method of this example embodiment will be verified from the relationship between the evaluation results of evaluated lamination shaping powders, the squeegeeing property test using the jig, and the squeegeeing property of the laminating and shaping apparatus.

<<Manufacture of Lamination Shaping Copper Powders>>

By using gases such as helium, argon, and nitrogen as gas atomization of a gas atomizing method, copper powders or copper alloy powders were generated by controlling powdering by adjusting the pressure and flow rate of each gas, and the evaluation criteria of the lamination shaping powder evaluation method of this example embodiment were verified. However, the following examples can be referred to even for another powder or another metal powder.

<<Adhesive Force Measurement>>

The shearing stress of a copper powder or a copper alloy powder was measured by using a searing stress measurement kit and input to Powder Rheometer FT4 (manufactured by Malvern Instruments), and the adhesive force was calculated in accordance with FIG. 2B. Table 1 shows the correspondence between the FR (sec/50 g) measurement results complying with JIS Z 2502 and the adhesive force measurement results in Examples 1 to 9 and Comparative Examples 1 to 7.

TABLE 1

Correspondence Table of FR (sec/50 g) and Adhesive Force (kPa)

| | FR (sec/50 g) | Adhesive force (kPa) |
|---|---|---|
| Example 1 | 15.0 | 0.337 |
| Example 2 | Unmeasurable | 0.374 |
| Example 3 | 65.1 | 0.282 |
| Example 4 | Unmeasurable | 0.284 |
| Example 5 | 10.8 | 0.378 |
| Example 6 | 18.1 | 0.425 |
| Example 7 | Unmeasurable | 0.397 |
| Example 8 | Unmeasurable | 0.318 |
| Example 9 | 12.3 | 0.447 |
| Comparative Example 1 | Unmeasurable | 0.682 |
| Comparative Example 2 | Unmeasurable | 0.810 |
| Comparative Example 3 | Unmeasurable | 0.482 |
| Comparative Example 4 | Unmeasurable | 0.716 |
| Comparative Example 5 | Unmeasurable | 0.530 |
| Comparative Example 6 | Unmeasurable | 0.427 |
| Comparative Example 7 | Unmeasurable | 1.170 |

As is apparent from Table 1, the adhesive force measurement result can be obtained even for a copper powder or a copper alloy powder that is "unmeasurable" in the FR (sec/50 g) measurement result. Therefore, even for a powder found to be unusable by the FR (sec/50 g) measurement result, it is possible to determine whether the powder is usable as a lamination shaping powder.

<<Measurements of 50% Particle Size and Apparent Density>>

The 50% particle size (μm) of a copper powder or a copper alloy powder of each of Examples 1 to 9 and Comparative Examples 1 to 7 was measured by the laser diffraction method (Microtrac MT3300: manufactured by MicrotrackBEL). Also, the apparent density (g/cm$^3$) of the copper powder or the copper alloy powder was measured in accordance with JIS Z 2504.

<<Test of Squeegeeing Property>>

The squeegeeing property of a copper powder or a copper alloy powder of each of Examples 1 to 9 and Comparative Examples 1 to 7 was tested by using the jig 300 shown in FIG. 3.

Figure 5:
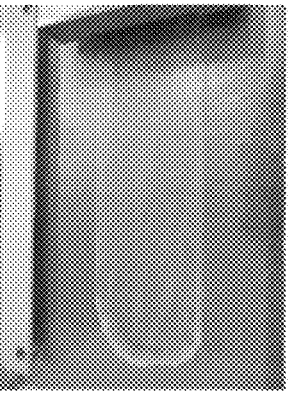
FIG. 5 is a view showing the test results of the squeegeeing properties of powders of Comparative Examples 1 and 2 of the present invention.

FIG. 4 is a view showing the test results of the squeegeeing properties of powders of Examples 1 to 3. FIG. 5 is a view showing the test results of the squeegeeing properties of powders of Comparative Examples 1 and 2. FIGS. 4 and 5 show only some of the examples and the comparative examples, but the results of other examples and other comparative examples were also similar.

Table 2 shows the correspondence between the characteristics (the adhesive force, 50% particle size, and apparent density) and the squeegeeing property test results of Examples 1 to 9 and Comparative Examples 1 to 7.

TABLE 2

Correspondence Table of Powder Characteristics and Squeegeeing Property

| | Adhesive force (kPa) | 50% particle size (μm) | Apparent density (g/cm³) | Squeegeeing property | Evaluation of manufacturability |
|---|---|---|---|---|---|
| Example 1 | 0.337 | 29.9 | 5.09 | ● | Very good |
| Example 2 | 0.374 | 25.1 | 5.88 | ○ | Good |
| Example 3 | 0.282 | 16.6 | 5.16 | ○ | Good |
| Example 4 | 0.284 | 9.73 | 4.27 | ○ | Good |
| Example 5 | 0.378 | 42.4 | 4.81 | ● | Very good |
| Example 6 | 0.425 | 25.8 | 5.28 | ○ | Good |
| Example 7 | 0.397 | 23.6 | 5.09 | ○ | Good |
| Example 8 | 0.318 | 24.8 | 4.17 | ○ | Good |
| Example 9 | 0.447 | 34.3 | 4.59 | ○ | Good |
| Comparative Example 1 | 0.682 | 16.0 | 3.44 | X | Manufacturing was impossible because powder could not evenly be spread |
| Comparative Example 2 | 0.810 | 27.3 | 4.12 | X | Manufacturing was impossible because powder could not evenly be spread |
| Comparative Example 3 | 0.482 | 8.25 | 3.40 | X | Manufacturing was impossible because powder could not evenly be spread |
| Comparative Example 4 | 0.716 | 25.7 | 4.87 | X | Manufacturing was impossible because powder could not evenly be spread |
| Comparative Example 5 | 0.530 | 34.7 | 4.32 | Δ | Spreading was possible but coarse portions were found |
| Comparative Example 6 | 0.427 | 4.67 | 3.13 | X | Packing of powder layer was insufficient and density was low |
| Comparative Example 7 | 1.170 | 2.55 | 2.51 | X | Powder violently scattered and adhered on manufactured product again, and surface defects were found |

Squeegeeing property evaluation criteria
● Very good
○ Good
Δ Unsatisfactory
X Bad <<Results of Squeegeeing by Laminating and Shaping Apparatus>>

Figure 6:
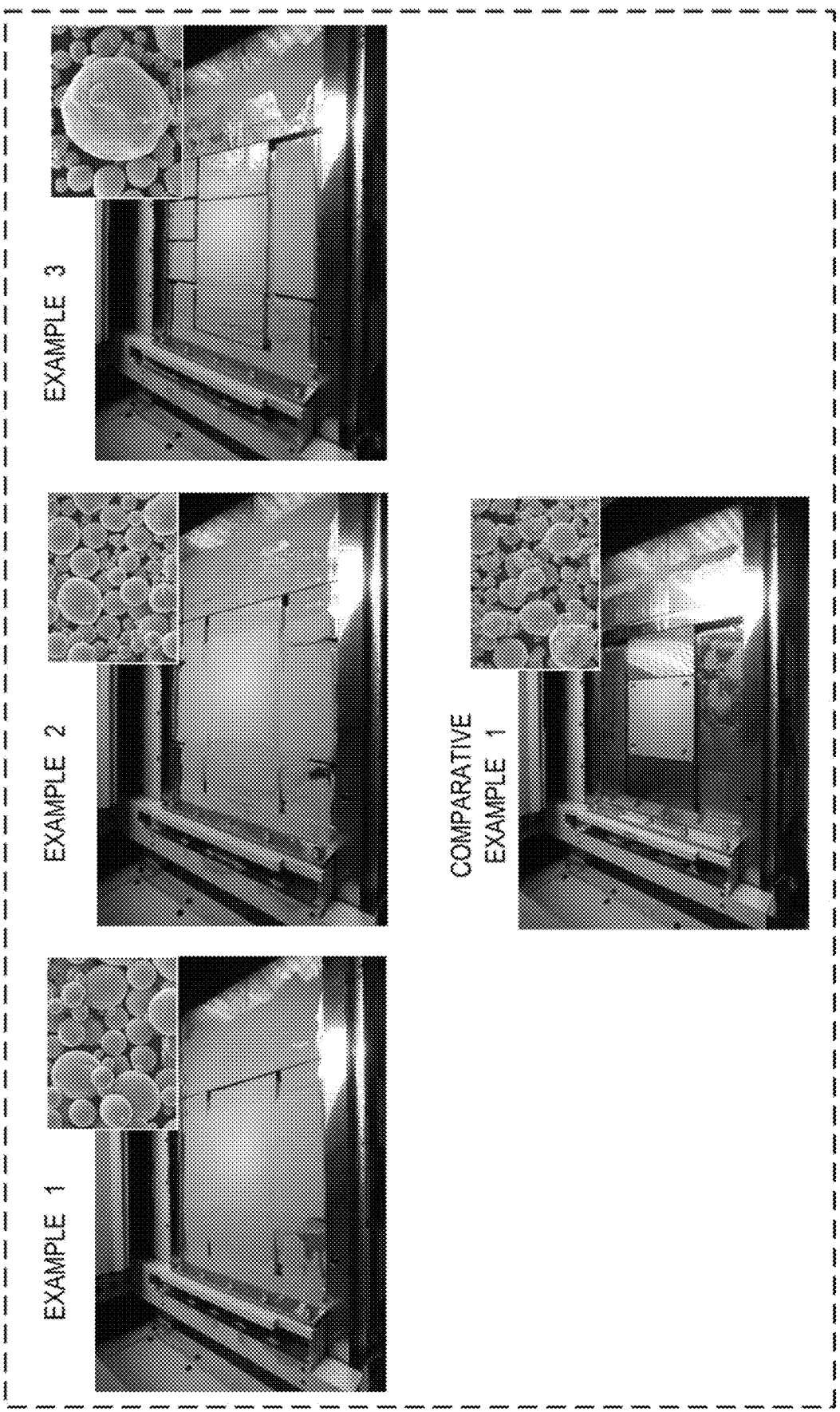
FIG. 6 is a view showing a state in which the powders of Examples 1 to 3 and Comparative Example 1 of the present invention were squeegeed in the laminating and shaping apparatus.
Figure 7A:
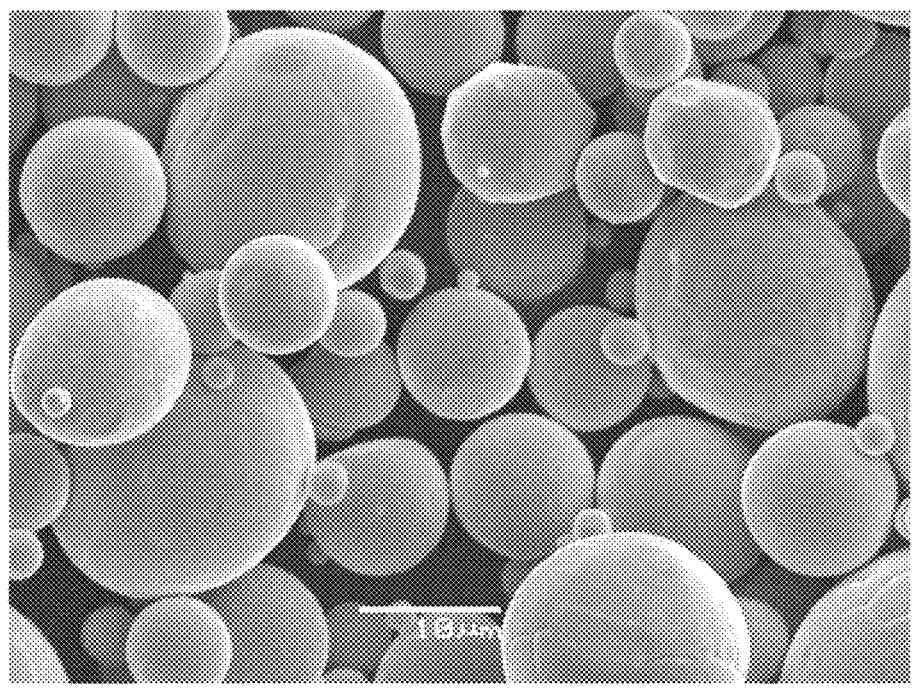
FIG. 7A is a view showing a scanning electron microscope (SEM) image for measuring the satellite adhesion ratio of the powder of Example 1 of the present invention.
Figure 7B:
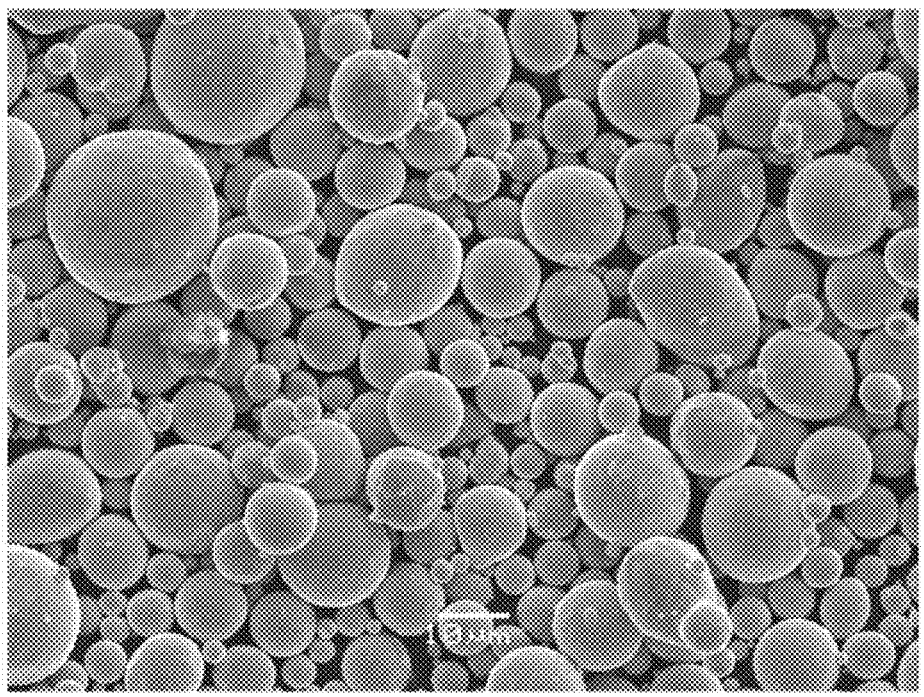
FIG. 7B is a view showing a scanning electron microscope (SEM) image for measuring the satellite adhesion ratio of the powder of Example 2 of the present invention.
Figure 7C:
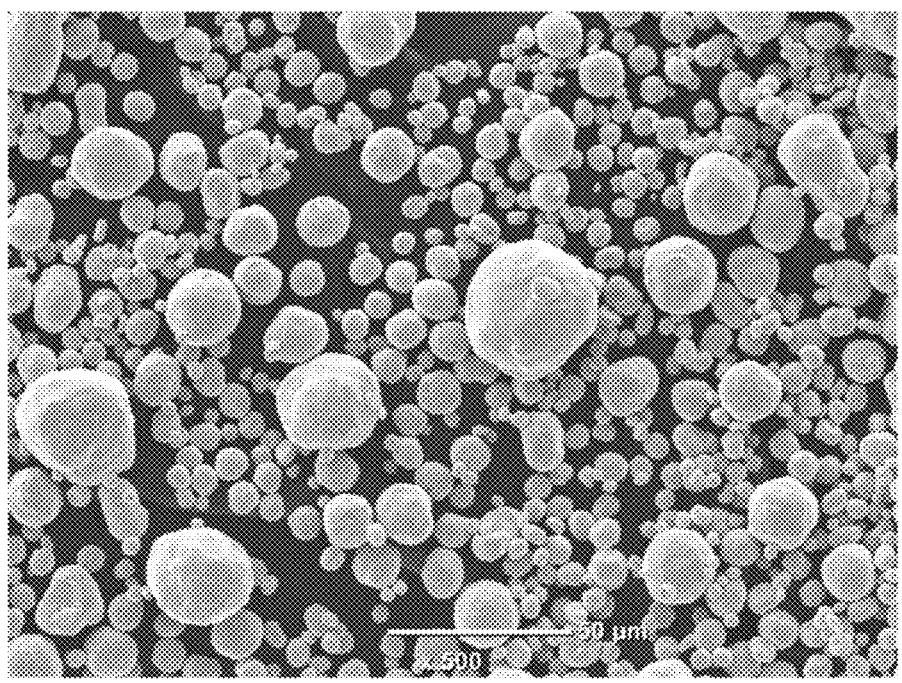
FIG. 7C is a view showing a scanning electron microscope (SEM) image for measuring the satellite adhesion ratio of the powder of Example 3 of the present invention.
Figure 7D:
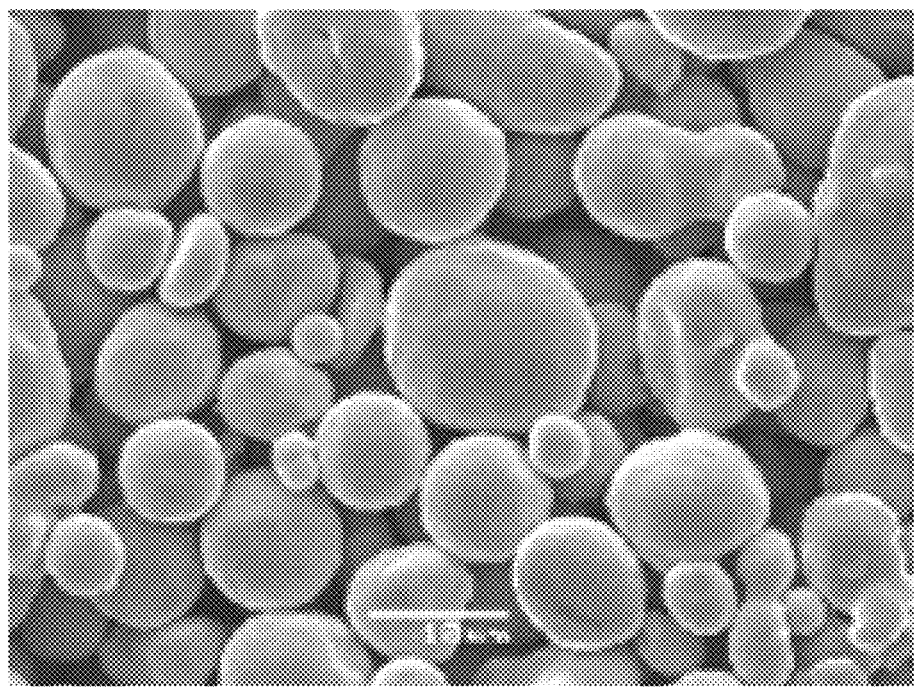
FIG. 7D is a view showing a scanning electron microscope (SEM) image for measuring the satellite adhesion ratio of a powder of Example 4 of the present invention.
Figure 7E:
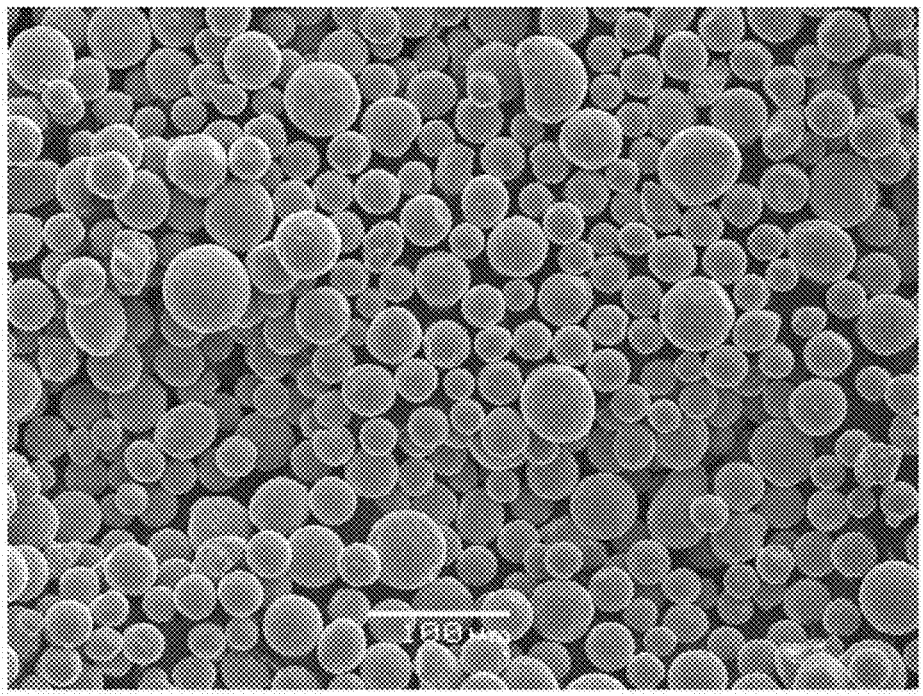
FIG. 7E is a view showing a scanning electron microscope (SEM) image for measuring the satellite adhesion ratio of a powder of Example 5 of the present invention.
Figure 7F:
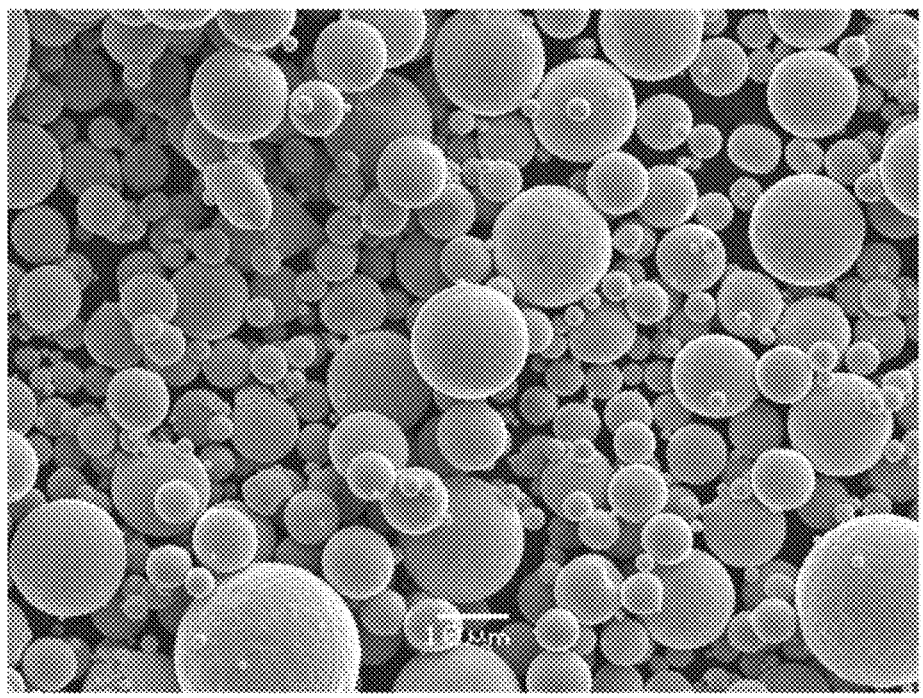
FIG. 7F is a view showing a scanning electron microscope (SEM) image for measuring the satellite adhesion ratio of a powder of Example 6 of the present invention.
Figure 7G:
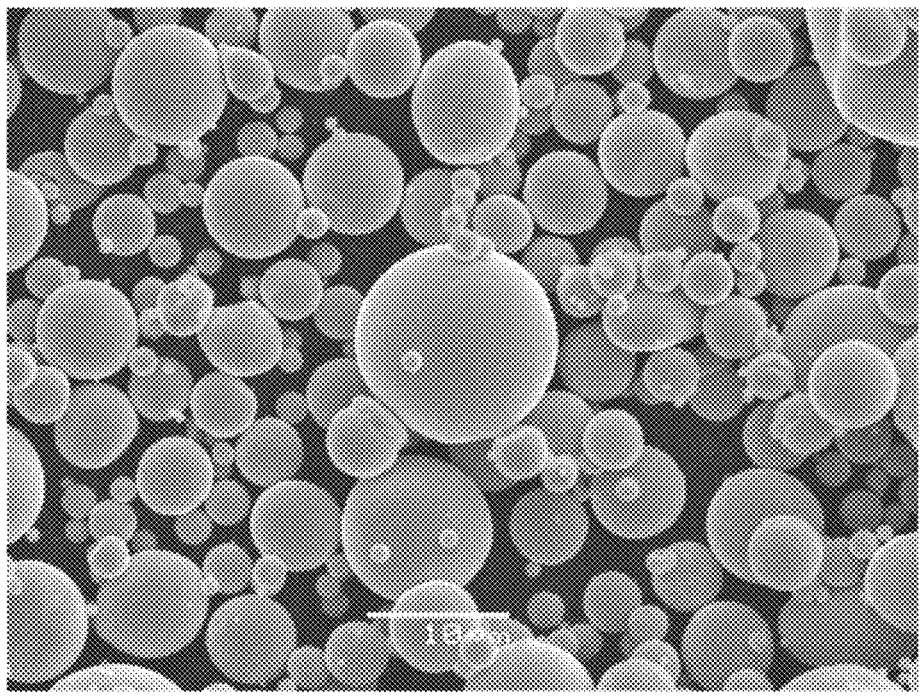
FIG. 7G is a view showing a scanning electron microscope (SEM) image for measuring the satellite adhesion ratio of a powder of Example 7 of the present invention.
Figure 7H:
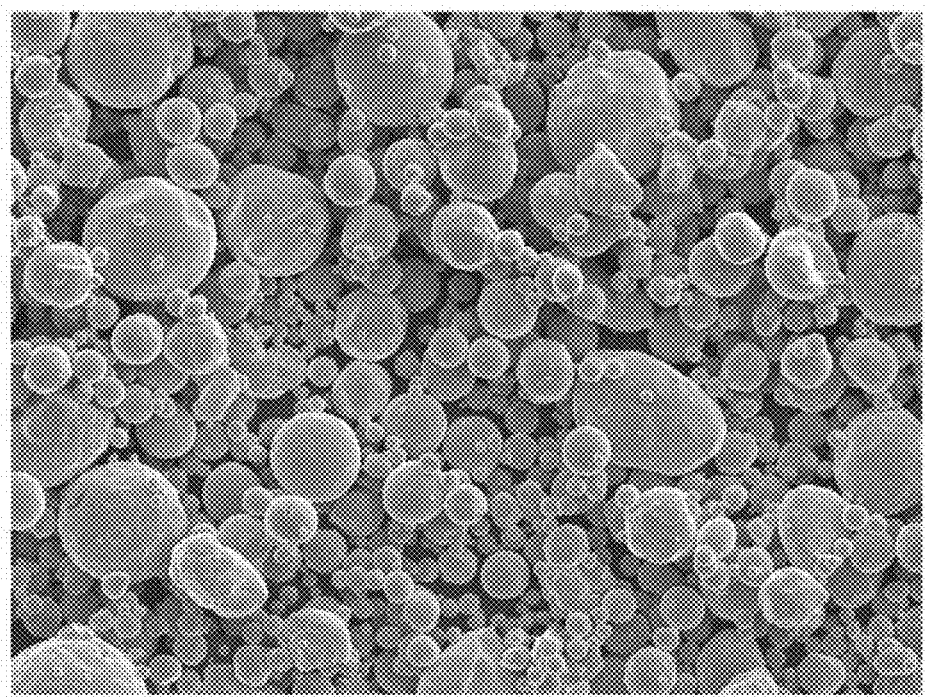
FIG. 7H is a view showing a scanning electron microscope (SEM) image for measuring the satellite adhesion ratio of a powder of Example 8 of the present invention.
Figure 7I:
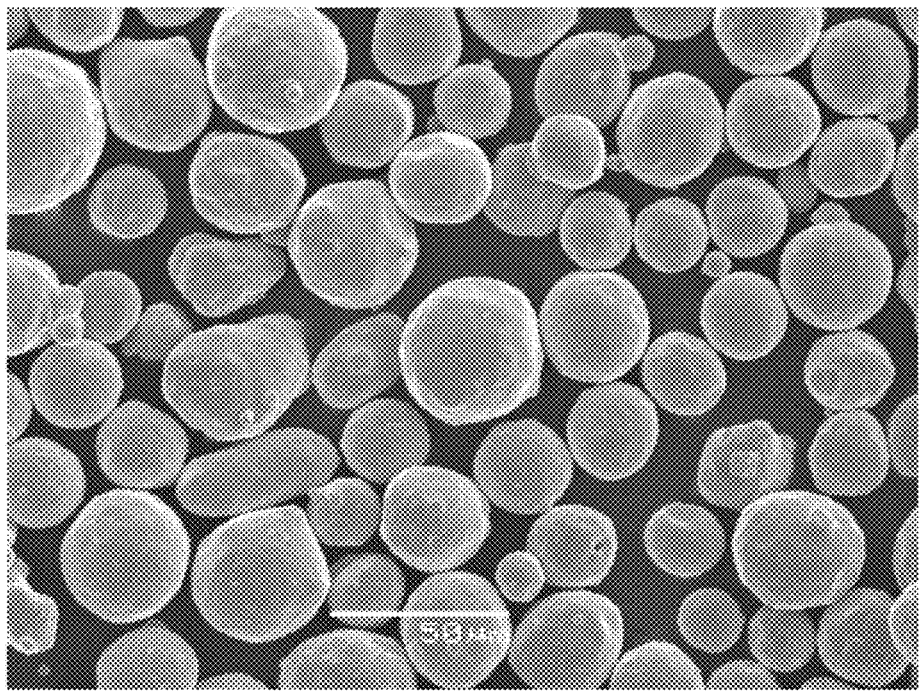
FIG. 7I is a view showing a scanning electron microscope (SEM) image for measuring the satellite adhesion ratio of a powder of Example 9 of the present invention.
Figure 8A:
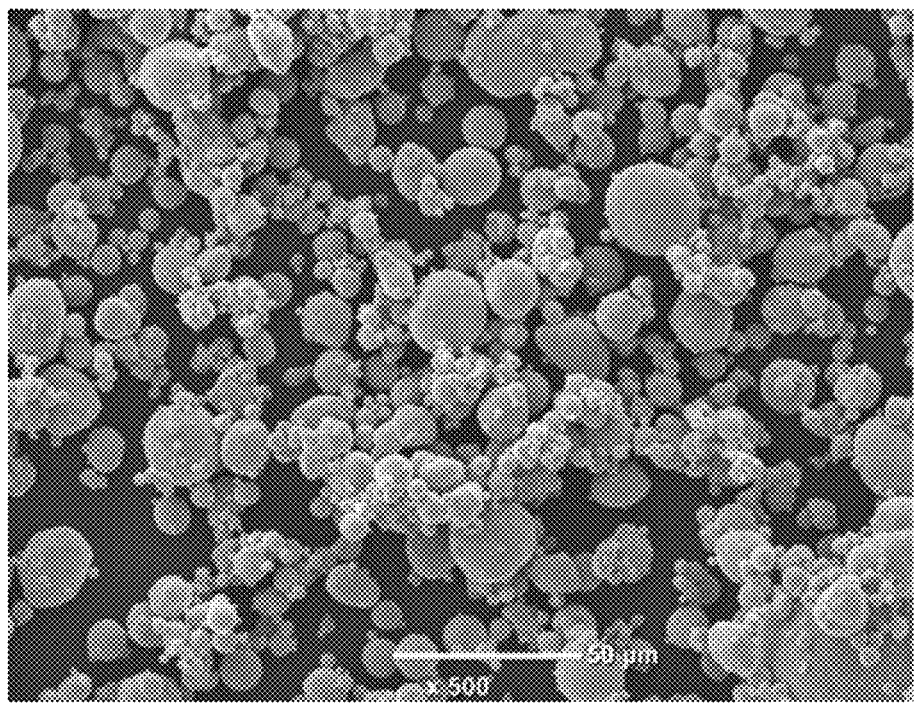
FIG. 8A is a view showing a scanning electron microscope (SEM) image for measuring the satellite adhesion ratio of the powder of Comparative Example 1 of the present invention.
Figure 8B:
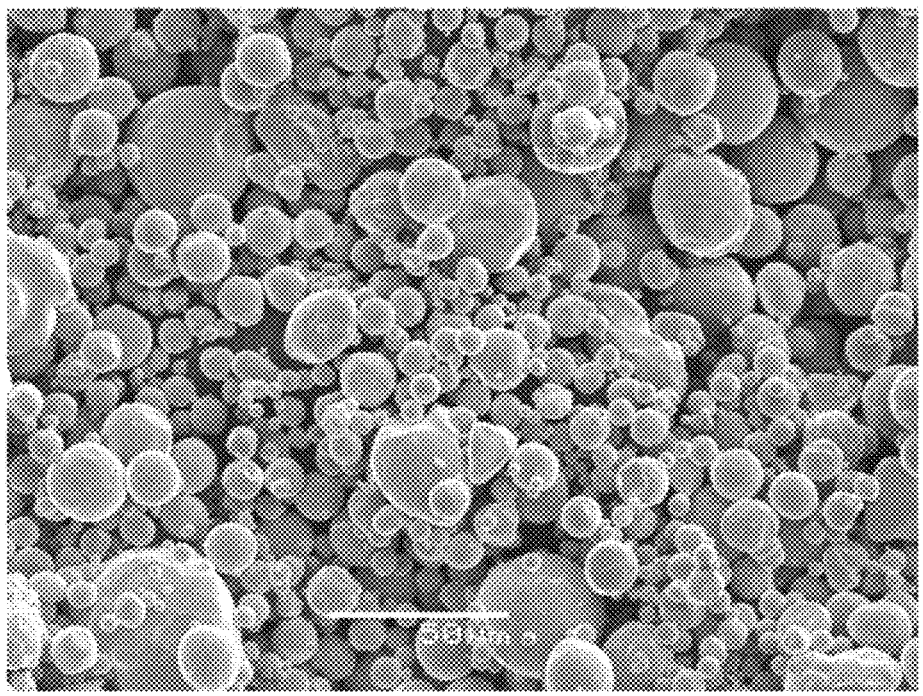
FIG. 8B is a view showing a scanning electron microscope (SEM) image for measuring the satellite adhesion ratio of the powder of Comparative Example 2 of the present invention.
Figure 8C:
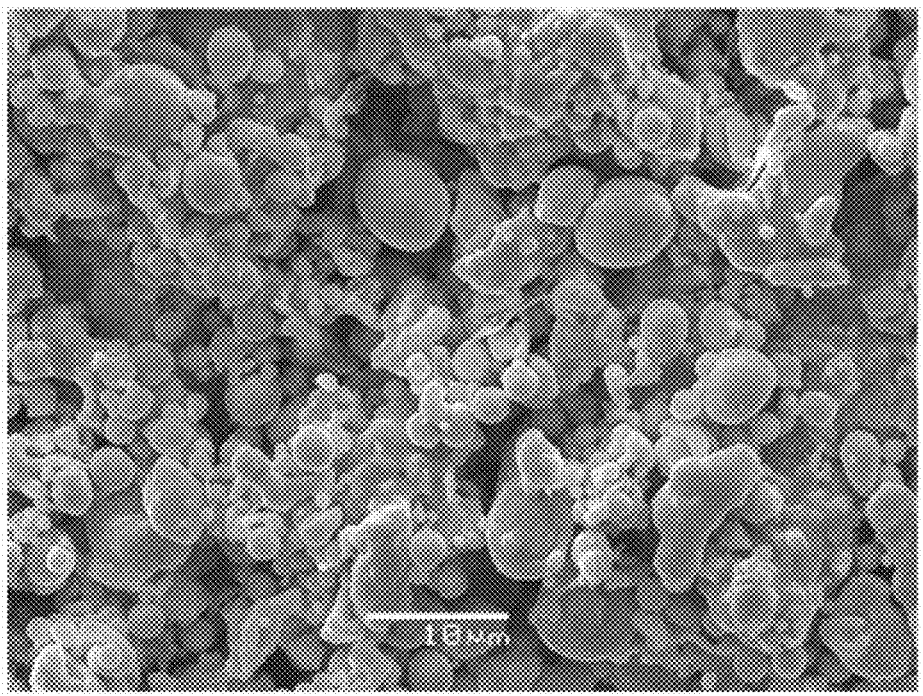
FIG. 8C is a view showing a scanning electron microscope (SEM) image for measuring the satellite adhesion ratio of a powder of Comparative Example 3 of the present invention.
Figure 8D:
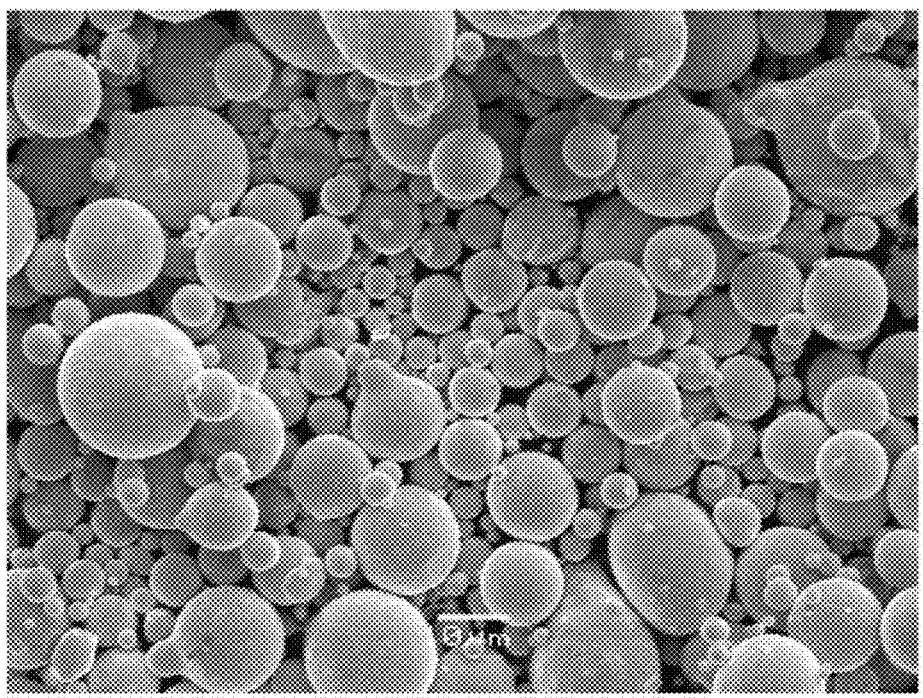
FIG. 8D is a view showing a scanning electron microscope (SEM) image for measuring the satellite adhesion ratio of a powder of Comparative Example 4 of the present invention.
Figure 8E:
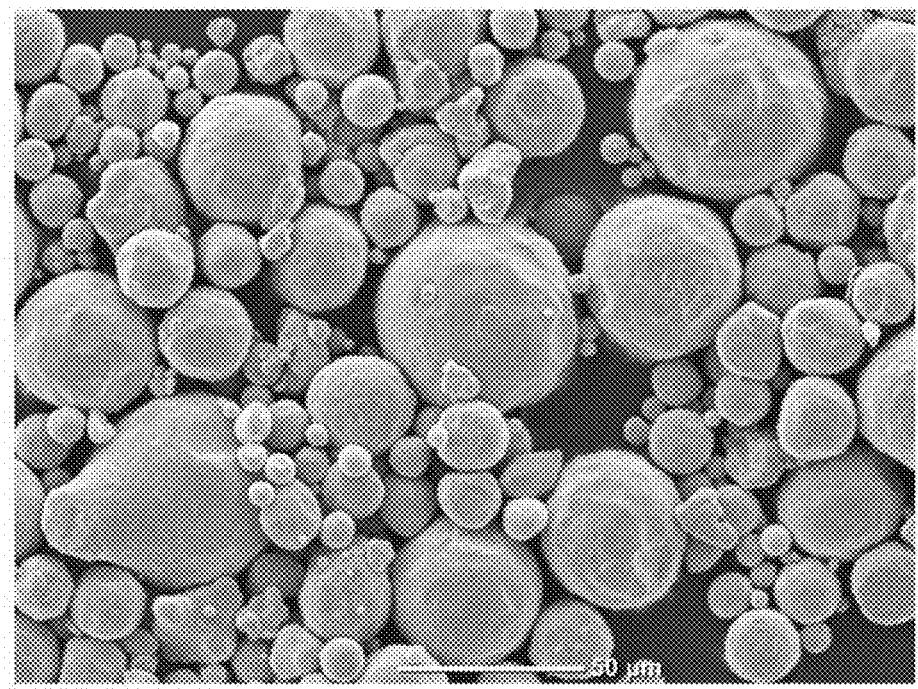
FIG. 8E is a view showing a scanning electron microscope (SEM) image for measuring the satellite adhesion ratio of a powder of Comparative Example 5 of the present invention.
Figure 8F:
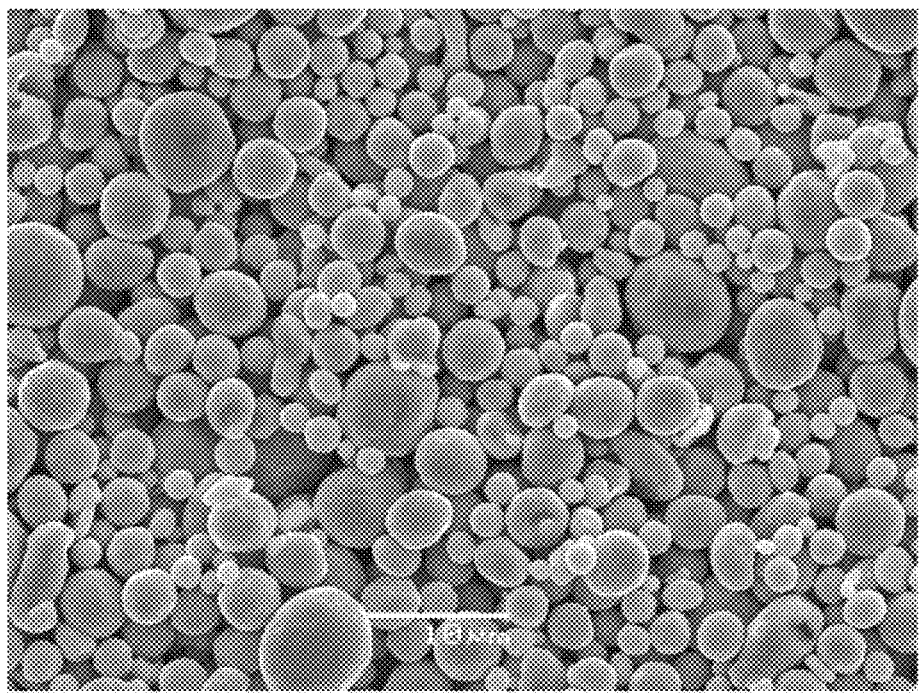
FIG. 8F is a view showing a scanning electron microscope (SEM) image for measuring the satellite adhesion ratio of a powder of Comparative Example 6 of the present invention.
Figure 8G:
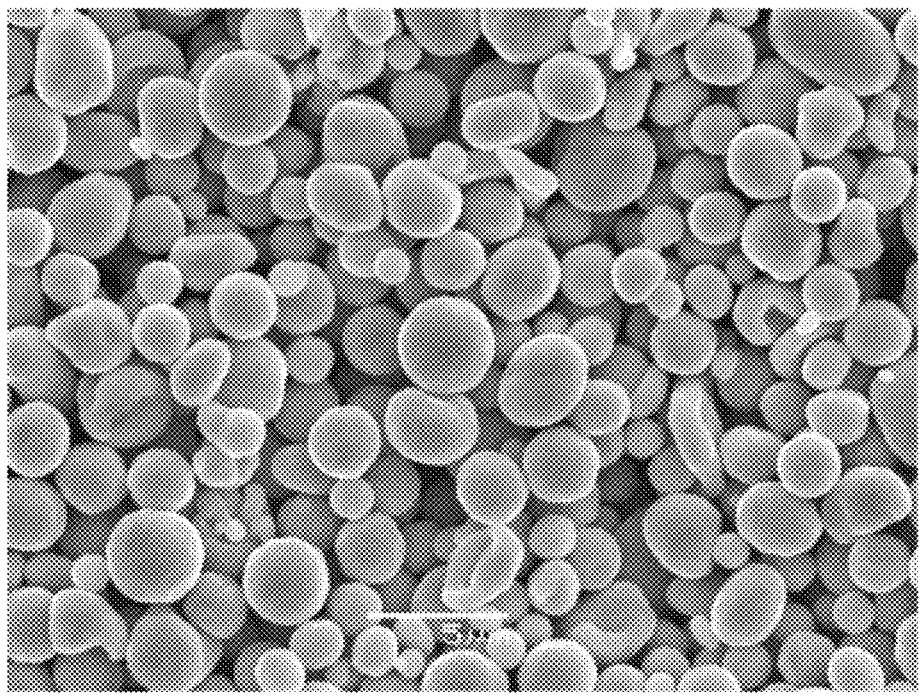
FIG. 8G is a view showing a scanning electron microscope (SEM) image for measuring the satellite adhesion ratio of a powder of Comparative Example 7 of the present invention.

FIG. 6 shows a state in which the powders of Examples 1 to 3 and Comparative Example 1 were squeegeed in the laminating and shaping apparatus. As shown in FIG. 6, when using a powder found to have a good squeegeeing property in Table 2, squeegeeing in the laminating and shaping apparatus was also good. By contrast, when using a powder found to have an unsatisfactory or bad squeegeeing property in Table 2, squeegeeing in the laminating and shaping apparatus was also unsatisfactory.

Accordingly, evaluation by the adhesive force, 50% particle size, and apparent density as the squeegeeing property criteria disclosed in this example embodiment were found to be useful.

<<Measurement of Satellite Adhesion Ratio>>

FIGS. 7A to 7I are views showing scanning electron microscope (SEM) images for measuring the satellite adhesion ratios of the powders of Examples 1 to 9. FIGS. 8A to 8G are views showing scanning electron microscope (SEM) images for measuring the satellite adhesion ratios of the powders of Comparative Examples 1 to 7. The satellite adhesion ratios of the powders of the examples and the comparative examples were obtained by using these scanning electron microscope (SEM) images.

Table 3 shows the correspondence between the characteristics (the adhesive force, 50% particle size, apparent density, and satellite adhesion ratio) and the squeegeeing property test results of Examples 1 to 9 and Comparative Examples 1 to 7.

TABLE 3

Correspondence Table of FR (sec/50 g), Adhesion Force (kPa), and Satellite Adhesion Ratio (%), and Squeegeeing Property

| | FR (sec/50 g) | Adhesive force (kPa) | Satellite adhesion ratio (%) | Squeegeeing property |
|---|---|---|---|---|
| Example 1 | 15.0 | 0.337 | 28 | ● |
| Example 2 | Unmeasurable | 0.374 | 39 | ○ |
| Example 3 | 65.1 | 0.282 | 13 | ○ |
| Example 4 | Unmeasurable | 0.284 | 13 | ○ |
| Example 5 | 10.8 | 0.378 | 17 | ● |
| Example 6 | 18.1 | 0.425 | 18 | ○ |
| Example 7 | Unmeasurable | 0.397 | 32 | ○ |
| Example 8 | Unmeasurable | 0.318 | 23 | ○ |
| Example 9 | 12.3 | 0.447 | 39 | ○ |
| Comparative Example 1 | Unmeasurable | 0.682 | 51 | X |
| Comparative Example 2 | Unmeasurable | 0.810 | 38 | X |
| Comparative Example 3 | Unmeasurable | 0.482 | 65 | X |
| Comparative Example 4 | Unmeasurable | 0.716 | 25 | X |
| Comparative Example 5 | Unmeasurable | 0.530 | 43 | Δ |
| Comparative Example 6 | Unmeasurable | 0.427 | 15 | X |
| Comparative Example 7 | Unmeasurable | 1.170 | 15 | X |

The invention claimed is:

1. A method of preparing for lamination shaping a powder that is configured to be spread into a uniform powder layer on a table of a laminating and shaping apparatus, the method comprising the steps of:
(a) subjecting a prospective powder for the lamination shaping to a shear test which is conducted by a powder rheometer and by which a failure envelope based on a shearing stress and a normal stress is obtained;

(b) calculating an adhesive force of the prospective powder as the shearing stress when the normal stress is zero on the obtained failure envelop to be used to evaluate whether or not the prospective powder is spreadable into the uniform powder layer on the table of the laminating and shaping apparatus; and (c) excluding the prospective powder from the powder for lamination shaping if the adhesive force of the prospective powder is not suitable for spreading the prospective layer into the uniform powder layer, and including the prospective powder in the powder for lamination shaping if the adhesive force of the prospective powder is suitable for spreading the prospective layer into the uniform powder layer.

2. The method according to claim 1, wherein the prospective powder is excluded from the powder for lamination shaping if the adhesive force is greater than 0.450 kPa, and is included in the prospective powder in the powder for lamination shaping if the adhesive force is equal to or less than 0.450 kPa.

3. The method according to claim 1, further comprising conducting another test or tests for determining whether the prospective powder is suitable for inclusion in the powder for lamination shaping, the other test or tests comprising a test evaluating a 50% particle size of the powder by laser diffraction, a test evaluating apparent density of the prospective powder or both.

4. The method according to claim 3, wherein the prospective powder is included in the powder for lamination shaping if the adhesive force of the prospective powder is suitable for spreading the prospective layer into the uniform powder layer and either the 50% particle size of the powder is determined to be within a range of 3 to 250 μm or the apparent density of the powder is determined to be equal to or more than 3.5 g/cm$^3$.

5. The method according to claim 3, wherein the prospective powder is further evaluated by a test for a satellite adhesion ratio of the prospective powder, which is defined by a ratio of particles having satellite-like fine particles adhered on particle surfaces to particles of the prospective powder.

6. The method according to claim 5, wherein the prospective powder is determined to be suitable for inclusion in the powder for lamination shaping if the adhesive force of the prospective powder is suitable for spreading the prospective layer into the uniform powder layer, the test for satellite adhesion ratio is equal to or less than 50% and either the 50% particle size of the powder is determined to be 3 to 250 μm or the apparent density of the powder is determined to be equal to or more than 3.5 g/cm$^3$.

7. The method according to claim 1, wherein the prospective powder is metal powder or metal alloy powder.

8. The method according to claim 1, wherein the metal powder or the metal alloy powder is copper powder or copper alloy powder.

9. The method according to claim 2, wherein the prospective powder is copper powder or copper alloy powder.

10. The method according to claim 4, wherein the prospective powder is copper powder or copper alloy powder.

11. The method according to claim 6, wherein the prospective powder is copper powder or copper alloy powder.

12. The method according to claim 1, wherein the prospective powder is further evaluated by a test for a satellite adhesion ratio of the prospective powder, which is defined by a ratio of particles having satellite-like fine particles adhered on particle surfaces to particles of the prospective powder.

13. The method according to claim 12, wherein the prospective powder is copper powder or copper alloy powder.

14. The method according to claim 13, wherein the prospective powder is determined to be suitable for inclusion in the powder for lamination shaping if the adhesive force of the prospective powder is suitable for spreading the prospective layer into the uniform powder layer and the test for satellite adhesion ratio is equal to or less than 50%.

15. A method comprising the steps of:
(i) preparing the powder for lamination shaping according to claim 1;
(ii) introducing the powder onto a table of a laminating and shaping apparatus; and
(iii) spreading the introduced powder into a uniform powder layer on the table to conduct lamination shaping.

* * * * *